US006316651B1

(12) United States Patent
Dougherty et al.

(10) Patent No.: US 6,316,651 B1
(45) Date of Patent: Nov. 13, 2001

(54) ENVIRONMENTALLY BENIGN GROUP II AND GROUP IV OR V SPIN-ON PRECURSOR MATERIALS

(75) Inventors: T. Kirk Dougherty, Playa Del Rey; John J. Drab, Santa Barbara, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/395,695

(22) Filed: Sep. 13, 1999

Related U.S. Application Data

(63) Continuation-in-part of application No. 09/307,589, filed on May 7, 1999, now Pat. No. 6,054,600.

(51) Int. Cl.$^7$ .............................. C07F 19/00; C07F 7/00; C07F 9/00; B05D 5/12
(52) U.S. Cl. ................................. 556/30; 556/1; 556/44; 556/55; 427/126.3; 423/608; 423/617; 423/618
(58) Field of Search ................................. 556/30, 44, 55, 556/1; 427/126.3; 423/608, 617, 618

(56) References Cited

U.S. PATENT DOCUMENTS

| | | | |
|---|---|---|---|
| 5,434,102 | 7/1995 | Watanabe et al. | 437/130 |
| 5,439,845 | 8/1995 | Watanabe et al. | 437/130 |
| 5,514,822 | 5/1996 | Scott et al. | 556/28 |
| 5,721,009 | 2/1998 | Dougherty et al. | 427/126.6 |
| 6,054,600 | * 4/2000 | Dougherty et al. | 556/44 |

FOREIGN PATENT DOCUMENTS

WO93/12538   6/1993   (WO) .

OTHER PUBLICATIONS

J.V. Mantese et al, "Metalorganic Deposition (MOD): A Nonvacuum, Spin–on, Liquid–Based, Thin Film Method", *MRS Bulletin*, pp. 48–53 (Oct. 1989).

C.M. Vest et al, "Synthesis of Metallo–Organic Compounds for MOD Powders and Films", *Materials Research Society Symposium*, vol. 60, pp. 35–42 (1986).

Callender et al, "Aqueous Synthesis of Water–Soluble Alumoxanes: Environmentally Benign Precursors to Alumina and Alumina Based Ceramics", *Chemical Materials*, vol. 9, No. 11, pp. 2418–2433 (1997).

A.M. Bahl et al, "Heavy Alkaline Earth Polyether Carboxylates", *Inorganic Chemistry*, vol. 36, pp. 5413–5415 (1997).

* cited by examiner

*Primary Examiner*—Porfirio Nazario-Gonzalez
(74) *Attorney, Agent, or Firm*—Colin M. Raufer; Leonard A. Alkov; Glenn H. Lenzen, Jr.

(57) ABSTRACT

The present invention is directed to the synthesis, processing and test of improved spin-on precursor materials comprising at least one Group II metal and at least one Group IV or Group V metal, useful for making thin oxide films, useful, for example, in various electronic devices, such as ferroelectric devices. For example, barium strontium titanate spin-on precursor materials are useful for making thin films of barium strontium titanate (BST) for, e.g., ferroelectric capacitors. A method is provided for fabricating electronic devices employing such Group II-Group IV (or V) oxides as the active device, using polyether acids. The method comprises: (a) providing a substrate; (b) forming a bottom electrode on the substrate; (c) depositing a solution comprising polyether acid salts of the Group II and Group IV or Group V metal ions; (d) forming the oxide film from the solution; and (e) forming a top electrode on the oxide film. As a consequence of the method, improved electronic devices are formed from less toxic and easier handled precursors and solvents. The present invention provides for a soluble spin-on precursor which is compatible and soluble in non-toxic and environmentally benign solvents. In addition, this spin-on precursor material has been shown to give much improved electrical performance properties of the BST thin films produced.

13 Claims, 2 Drawing Sheets

ENVIRONMENTALLY BENIGN GROUP II AND GROUP IV OR V SPIN-ON PRECURSOR MATERIALS

CROSS-REFERENCE TO RELATED APPLICATION

The present application is a continuation-in-part of application Ser. No. 09/307,589, filed on May 7, 1999, now U.S. Pat. No. 6,054,600. That application is directed to the formation of Group IV and V metal acid salt complexes from polyether acid anhydrides, useful in the practice of the present invention.

TECHNICAL FIELD

The present invention relates to an improved process for fabricating Group II and Group IV or V ceramic materials, such as barium strontium titanate, and devices made therefrom via metallo-organic decomposition methods.

BACKGROUND ART

Barium strontium titanate (BST), which is an oxide ceramic, has a high dielectric constant and excellent ferroelectric and paraelectric properties. As a result, BST is extensively used in the electronics industry for dynamic random access memory (DRAM), ferroelectric, and paraelectric devices and in other applications where a high dielectric constant material is useful.

Applicant Ser. No. 09/300,962, filed Apr. 28, 1999, entitled "Voltage Variable Capacitor (Varactor) for High Frequency Power" describes a BST varactor and its application. The BST varactor was made using 2-ethylhexanoate acid salts.

Thin films of barium strontium titanate have been extensively studied for application in high density dynamic random access memories, monolithic microwave integrated circuit capacitors, tunable microwave filters, and phased array antennae.

Thin films of BST from 2-ethylhexanoate acid salts are also described in U.S. Pat. No. 5,514,822.

The synthesis of thin film ceramic from metal organic acid salts (most usually aliphatic acids such as neodeacanoic or 2-ethylhexanoic) is described in the above-referenced application Ser. No. 09/300,962; application Ser. No. 08/863,117, filed May 27, 1997, entitled "Process for Making Stoichiometric Mixed Metal Oxide Films"; Mantese, Micheli, Hamdi and West in MRS Bulletin, 1989, pp. 48–53; PCT Publication WO 93/12538 (Applicant: Symetrix Corporation); U.S. Pat. Nos. 5,434,102 and 5,439,845, issued to H. Watanabe et al; and C. M. Vest et al, *Materials Research Society Symposium*, Vol. 60 pp. 35–42 (1986).

The use of anhydride of 2-ethylhexanoic acid to better control the reaction of metal alkoxides to metal salts is disclosed and claimed in U.S. Pat. No. 5,721,009, issued Feb. 24, 1998.

Many of the foregoing references, while providing improved synthetic routes for preparing barium strontium titanate, nevertheless use solvents, such as xylenes and n-butyl acetate, that are toxic or not environmentally friendly.

A review of the need for environmentally benign ceramic precursors and the alumina precursor made from 3,6-dioxaheptanoic acid and an alumina mineral (Group III precursor) is described in "Aqueous Synthesis of Water-Soluble Alumoxanes: Environmentally Benign Precursors to Alumina and Alumina Based Ceramics", *Chemical Materials*, Vol. 9, No. 11, pp. 2418–2433 (1997).

A paper by A. M. Bahl et al, "Heavy Alkaline Earth Polyether Carboxylates", *Inorganic Chemistry*, Vol. 36, pp. 5413–5415 (1997) describes the synthesis of barium and strontium oxyacid complexes from the metal hydroxides. The reaction is long and produces water as a by-product, which may not be desired for some applications. The present invention provides for an anhydrous method to produce these compounds.

In a related patent application, "Polyether Acid Anhydride Useful for Improved Non-Toxic Solvent Soluble Group IV and V Metal Acid Salt Complexes", the titanium salt of 3,6-dioxaheptanoic acid is described; see, application Ser. No. 09/307,589, filed on May 7, 1999.

Thus, there is a need for providing improved quality Group II and Group IV or Group V metal oxide films, such as BST films, with less toxic solvents.

DISCLOSURE OF INVENTION

The present invention is directed to the synthesis, processing and test of improved Group II and Group IV or Group V metal spin-on precursor materials, such as barium strontium titanate (BST), useful for making thin films of oxides of these metals. BST is an oxide ceramic extensively used for DRAM, ferroelectric, paraelectric and in applications where a high dielectric constant material is useful. The present invention provides for a soluble spin-on precursor which is compatible and soluble in non-toxic and environmentally benign solvents. In addition, this spin-on precursor material has been shown to give much improved electrical performance properties of the BST thin films produced.

In accordance with the present invention, metal acid salt complexes are provided comprising (1) a first metal comprising at least one Group II ion and at least one second metal selected from the group consisting of Group IV and Group V ions and (2) a polyether acid. The metal acid salt complexes are prepared by combining (1) at least one first metal and at least one second metal ion and (2) at least one of a polyether acid and a polyether acid anhydride. Solutions of these metal acid salt complexes in water and/or an alchol and/or other polar solvents are also provided, useful in the preparation of the metal oxide films.

Specifically, in accordance with the present invention, a method is provided for fabricating electronic devices employing Group II–Group IV (or Group V) oxide as the active device. The method comprises:

(a) providing a substrate;
(b) forming a bottom electrode on the substrate;
(c) depositing a solution comprising polyether acid salts of the Group II–Group IV (or Group V) metal ion on the bottom electrode;
(d) forming an oxide film from the solution; and
(e) forming a top electrode on the oxide film.

The present invention is directed to the formation of improved electronic devices from less toxic and easier handled precursors and solvents.

BEST MODES FOR CARRYING OUT THE INVENTION

Figure 1A:
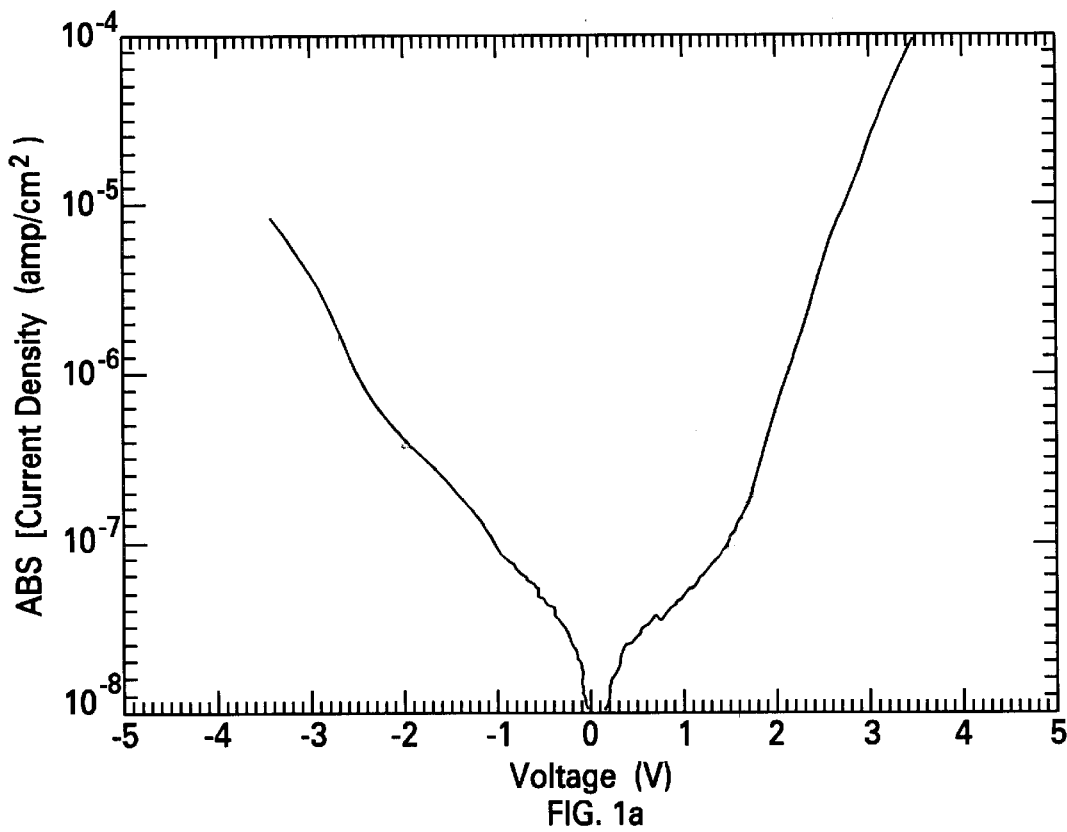
FIG. 1a, on coordinates of the current density (amp/cm$^2$) and voltage (v), is an I-V plot of an improved 1200 Å thin film capacitor prepared in accordance with the teachings of the present invention.

The present invention provides for improved electrical performance high dielectric constant materials, voltage variable dielectric materials and the like. The materials described are soluble and processable/compatible in much less toxic solvents than the prior art.

The present invention is directed to the use of the metal salts of Group II and Group IV or V ions and a polyether acid; specifically, the present invention is directed to the use of barium, strontium, and titanium with 3,6-dioxaheptanoic acid to produce improved quality BST films. The solvents used are 2-propanol and water, which are considerably less toxic than xylenes and n-butyl acetate used in the prior art.

Examples of Group II ions include barium and strontium, while examples of Group IV ions include titanium and zirconium and Group V ions include vanadium, tantalum and niobium. These ions are combined to form oxide films having ferroelectric properties. BST is one example of such an oxide film. Other examples include barium strontium niobate and strontium niobate.

A patented VHF power converter was developed to meet the demanding cost and performance requirements of high power, high frequency electronic systems such as active arrays and high speed processors. The use of the ferroelectric variable capacitor to regulate the power converter greatly decreases the circuit complexity cost, weight and will improve device system performance. The present invention provides for this varactor and more broadly thin film barium strontium titanate materials superior to the prior art described in above-referenced application Ser. No. 09/300, 962 and processable and compatible with non-toxic solvents.

The present invention provides for improved materials compatible with less toxic solvents useful for manufacture of these (and other) products.

Due to its high dielectric constant, paraelectricity and ferroelectricity, BST is a pervasive material in the electronics industry. This invention provides for a new low toxicity method for production of BST thin films.

Summarizing, improved thin film materials are provided using the barium, strontium and titanium metal salts of 3,6-dioxaheptanoic acid (and more broadly, other polyether acids) as compared to the all aliphatic acid analogues (for example, 2-ethylhexanoic acid or neodecanoic acid). These precursors are soluble in, and can be processed using, much less toxic solvents.

The use of the titanium polyether acid salt (described in above-referenced application Ser. No. 09/307,589) in the production of barium strontium titanate thin films is described below, along with the anhydrous synthesis of the barium and strontium precursors. The processing of a mixture of these in non-toxic solvents to give improved performance BST thin films is lastly described.

The present invention allows production of improved metal oxide precursor for ceramics and metal oxide thin films. It extends the use of the polyether acids (one example being 3,6-dioxaheptanoic acid) as precursor salts to the formation of the metal oxides, which comprise at least one first metal selected from the group consisting of Group II metals and at least one second metal selected from the group consisting of Group IV and Group V metals. Other examples of polyether acids include 3,6,9-trioxaheptanoic acid, methoxy acetic acid, and ethoxy acetic acid. The polyether acids useful in the practice of the present invention have the formula $$CH_3O(CH_2CH_2O)_nCH_2COOH$$

where n is 0 to 2.

Summarizing, improved thin film materials have made using the metal salts of 3,6-dioxaheptanoic acid (and more broadly, other polyether acids) as compared to the all aliphatic acid analogues (for example, 2-ethylhexanoic acid or neodecanoic acid).

The general synthetic route to providing polyether acid metal acid salt complexes is as follows:

1. Prepare polyether acid anhydride from corresponding polyether acid by combining the polyether acid with a dehydrating agent;
2. Prepare metal acid salt complex for the Group II metal(s) by reacting the metal(s) with polyether acid;
3. Prepare metal acid salt complex for the Group IV and Group V metals by combining a mixture of the polyether acid anhydride and metal alkoxide, either simultaneously or sequentially. In some instances, it may be desirable to also include the corresponding polyether acid in the mixture.

The dehydrating agent used in the first reaction may comprise any of the known dehydrating agents used to convert organic acids to the corresponding anhydride. Examples include dicyclohexylcarbodiimide and acetic anhydride.

In the second reaction, the Group II metal is simply reacted with a polyether acid (the free acid) to produce the Group II metal acid salt complex.

The metal alkoxide used in the third reaction may comprise any of the known alkoxides for that metal. The Group IV metal alkoxides have the formula $$(R\text{---}O)_4\text{---}Me(IV),$$

while the Group V alkoxide is given by the formula $$(R\text{---}O)_5\text{---}Me(V),$$

where R is substituted and unsubstituted straight or branched alkyls ($C_1$ to $C_8$) and aryls, Me(IV) is selected from the group consisting of titanium and zirconium, and Me(V) is selected from the group consisting of vanadium, tantalum, and niobium.

Anhydrous Synthesis of Strontium (II)-3,6-Dioxaheptanoate

To a heated (gentle reflux), well-stirred mixture of 3,6-dioxaheptanoic acid (34.1 grams, 0.254 mol) in 2-propanol (45 grams) was carefully added in several portions strontium metal (dendritic, Strem Cat. No. 38-0074, 10.08 grams, 0.115 mol). The hydrogen evolution can be controlled by the rate of addition of the metal. The reaction mixture was allowed to reflux an additional hour after the entire amount of metal was added and dissolved. The water-white clear solution weighed 88.6 grams, giving a solution of 11.34% strontium, 1.29 mmol/g.

Anhydrous Synthesis of Barium (II)-3,6-Dioxaheptanoate

This solution was made in an identical manner to the strontium solution. The barium dissolved much faster than the strontium.

Formulation of Barium and Strontium-3,6-Dioxaheptanoate and Titanium (IV)-3,6-Dioxaheptanoate to a Processable and Non-Toxic Solvent-Containing Precursor to Barium Strontium Titanate Thin Films A BST precursor solution was made by combining 8.44 gram of the 1.29 mmol/g strontium (II)-3,6-dioxaheptanoate solution, 10.22 gram of a 1.07 mmol/gram barium (II)-3,6-dioxaheptanoate solution and 12.82 gram of a 1.726 mmol/gram titanium-(IV)-3,6-dioxaheptanoate solution described in related application Ser. No. 09/307,589. This was further diluted by adding 23.6 grams of 2-propanol to give the BST precursor solution used to make the thin film BST capacitor/varactor described next below.

Processing of Described BST Precursor to BST Thin Films

1. Substrate Preparation Including Bottom Electrode Evaporation

A conventional 20 mil thick silicon wafer was prepared with 5000 Å of a wet thermal oxide (silicon). A 25Å thick Ta adhesion layer followed by a 1800 Å thick Pt layer were e-beam evaporated onto the substrate. Sheet resistance of the electrodes was 0.73 ohm/square. The electrodes were pre-annealed in oxygen for 30 min at 650° C. to oxidize the Ta layer and stabilize the Pt layer.

2. Deposition and Firing of Barium Strontium Titanate Thin Film on Electroded Substrate Wafers were coated with the BST solution described above using 3 to 5 Krpm, 30 sec spin. After coating, the wafers were slowly lowered onto a 320° C. hot plate and baked for 4 minutes.

After spin-coating and hot plate baking, the wafers were fired in a small tube furnace in flowing $O_2$ at 700° C.

After firing, the wafers showed no signs of cracking and no adhesion failures. SEM analysis of the dielectric films showed the surface to be smooth. Thickness measurements showed the thickness to be approximately 1100 to 1700 Å.

3. Application of Top Electrode

A 1000 Å Pt top electrode was deposited through a shadow mask, using varying top electrode sizes of approximately 10, 15, 20, 40, 80 and 160 mil diameter. The stack was annealed at 700° C. for 2 hours before electrical test.

4. Initial Electrical Test

A device as made above in accordance with the invention was compared with the device prepared in accordance with the prior art technique disclosed in above-referenced application Ser. No. 09/300,962. Both devices were fabricated to the same size, namely, about $5\times10^{-4}$ cm$^2$. The thickness of the BST layer was 1,200 Å for the device of the present invention and was about 6,400 Å for the prior art device.

The devices were tested on an analytical prober. Contact to the top electrode was made directly with a probe tip and contact to the bottom electrode was made by scratching through the BST layer with a second probe tip. The I-V characteristics were measured using a HP 4145B Semiconductor parameter analyzer over the range of −3.5 v to +3.5 v. The C-V characteristics were measured using a HP4275A LCR meter at 100 KHz using a modulation voltage of 35 mV over a wide range of bias voltages. For a typical 10 mil diameter shadow mask capacitor, the capacitance ranged from 1.69 pF at 0 v to 0.75 pF at 6.5 v.

Figure 1B:
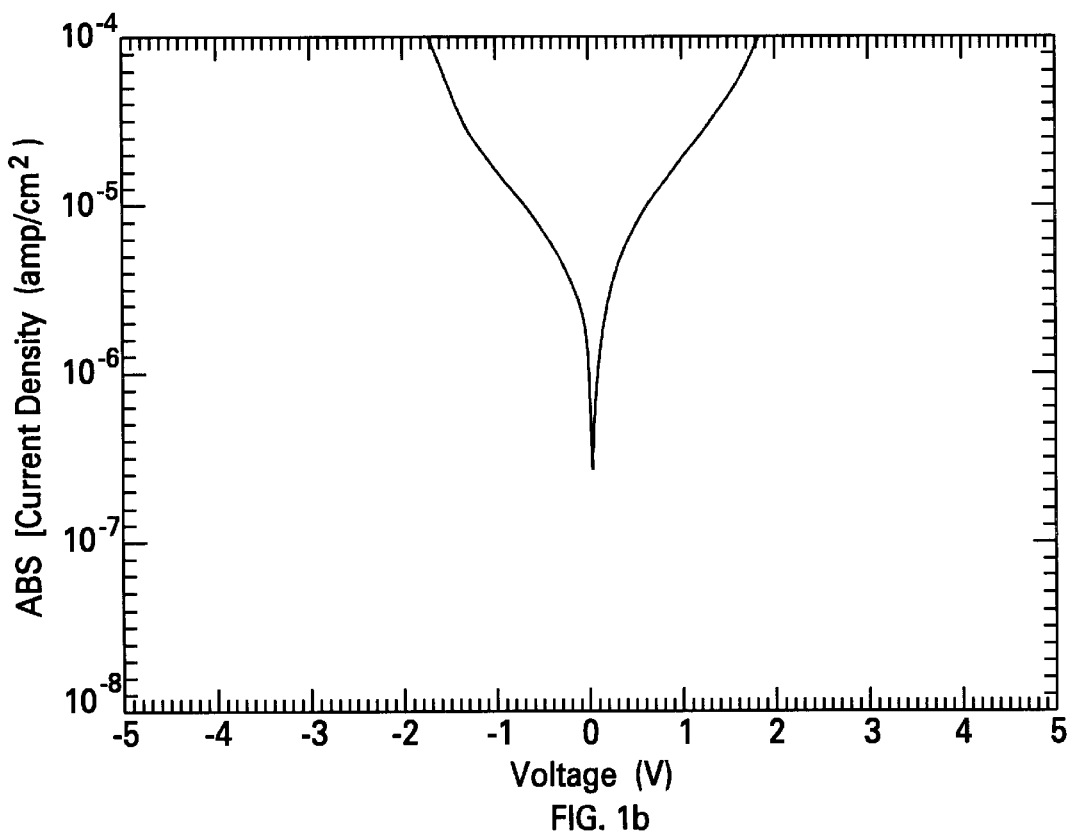
FIG. 1b is a plot similar to that of FIG. 1a, but showing the I-V plot for a 6400 Å thin film capacitor prepared by a prior art process.

FIGS. 1a and 1b provide a comparison of the I-V characteristics of the device prepared in accordance with the present invention with a device prepared by a prior art technique, as disclosed in the '962 application. The comparison shows the much improved leakage characteristics of the 1200 Å thick capacitor made in accordance with the present invention when compared to a prior art capacitor which is about five times thicker. It will be appreciated by those skilled in this art that thinner films typically evidence greater leakage than thicker films, all other parameters remaining the same.

Figure 2A:
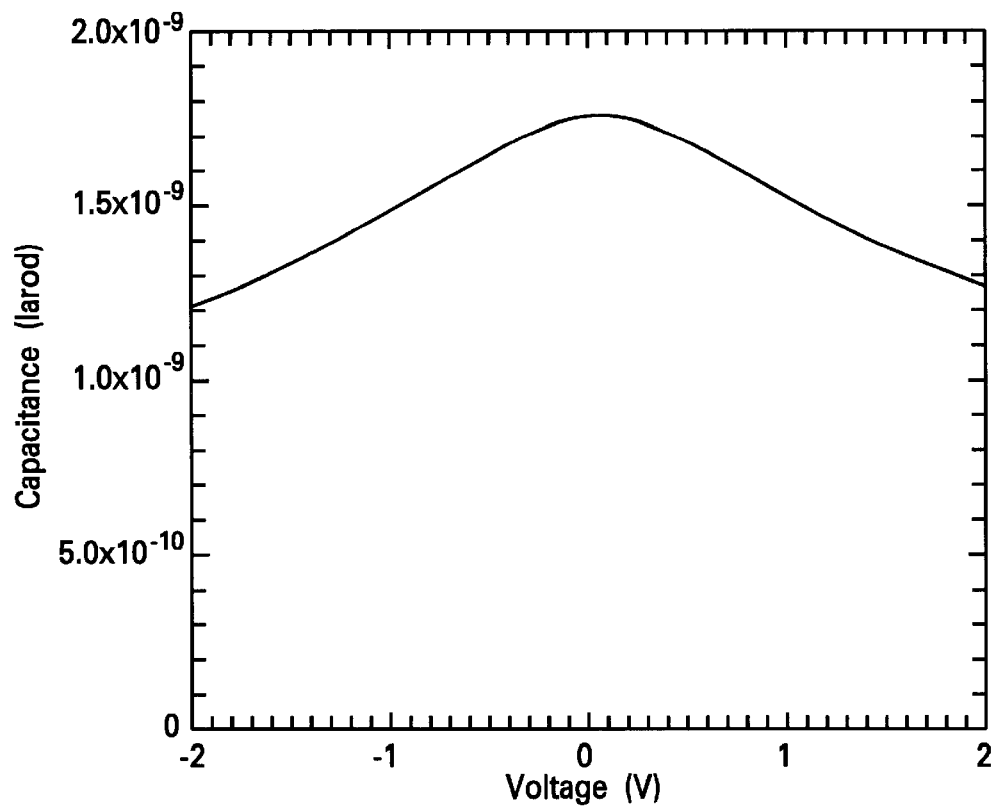
FIG. 2a, on coordinates of capacitance (farad) and voltage (V), is a C-V plot of an improved 1200 Å thin film capacitor prepared in accordance with the teachings of the present invention.
Figure 2B:
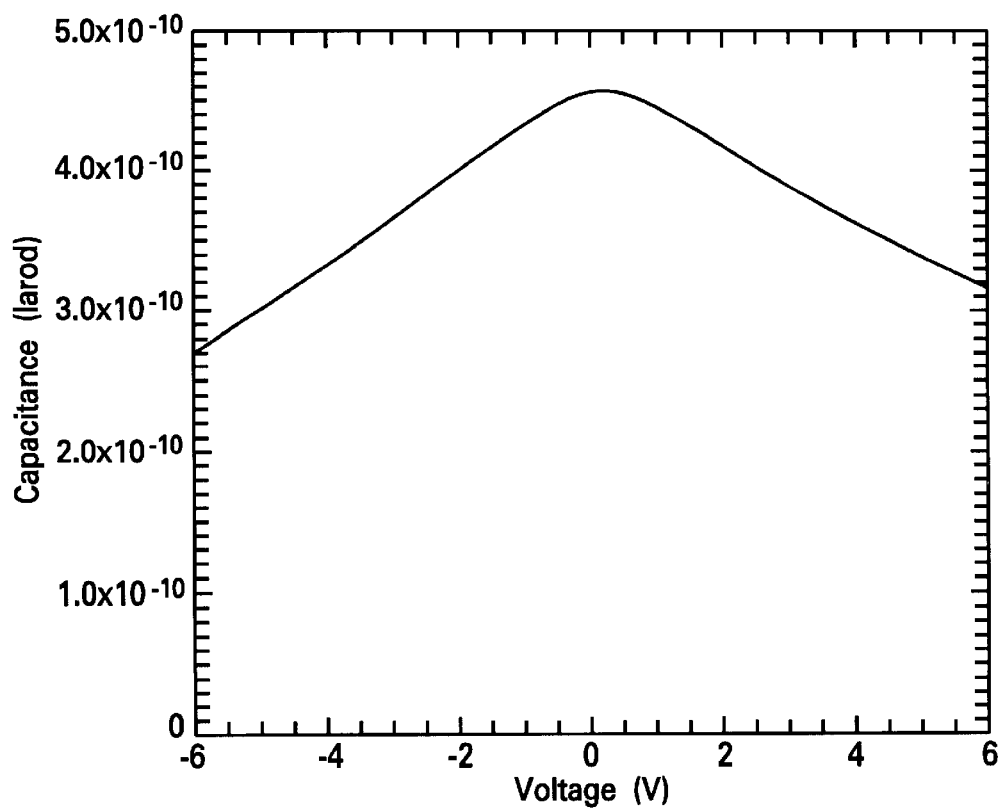
FIG. 2b is a plot similar to that of FIG. 2a, but showing the I-V plot for a 6400 Å thin film capacitor prepared by a prior art process.

FIGS. 2a and 2b provide a comparison of the C-V characteristics of the device prepared in accordance with the present invention with a device prepared by a prior art technique, as disclosed in the '962 application. Both plots show the expected change in capacitance as a function of applied voltage.

As such, a thin film low voltage switchable BST varactor for use in the patented VHF power converter has been disclosed. The present invention provides for improved devices as compared to the '962 application, and the processing of the solution precursors occurs in non-toxic environmentally benign solvents.

Industrial Applicability

The method of formation of barium strontium titanate films is expected to find use in the fabrication of electronic devices using this material as the active portion of the device.

Thus, there has been described a process for forming improved barium strontium titanate films. It will be readily apparent to those skilled in this art that various changes and modifications of an obvious nature may be made, and all such changes and modifications are considered to fall within the scope of the appended claims.

What is claimed is:

1. A metal acid salt complex comprising (1) a first metal comprising at least one Group II ion and at least one second metal selected from the group consisting of Group IV and Group V ions and (2) a polyether acid.

2. The metal acid salt complex of claim 1 wherein said Group II ion is selected from the group consisting of barium and strontium, said Group IV ion is selected from the group consisting of titanium and zirconium, and said Group V ion is selected from the group consisting of vanadium, tantalum, and niobium.

3. The metal acid salt complex of claim 2 wherein said metal acid salt complex comprises barium, strontium, and titanium ions in said polyether acid.

4. The metal acid salt complex of claim 1 wherein said polyether acid is given by the formula

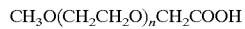

where n is 0 to 2.

5. A method of preparing a metal acid salt complex, said method comprising combining (1) at least one first metal selected from Group II metals reacted with a polyether acid and (2) at least one metal alkoxide comprising (a) at least one second metal selected from the group consisting of Group IV and Group V metals and (b) a polyether acid anhydride.

6. The method of claim 5 wherein said Group II metal is selected from the group consisting of barium and strontium, said Group IV metal is selected from the group consisting of titanium and zirconium, and said Group V metal is selected from the group consisting of vanadium, tantalum, and niobium.

7. The method of claim 6 wherein said metal acid salt complex comprises barium, strontium, and titanium ions in said polyether acid.

8. The method of claim 5 wherein said polyether acid is given by the formula

where n is 0 to 2.

9. A process for preparing a metal acid salt complex comprising (1) a first metal comprising at least one Group II metal and at least one second metal selected from the group consisting of Group IV and Group V metals and (2) a polyether acid, said process comprising:
(a) reacting said first metal with said polyether acid to form a first metal acid salt of said at least one Group II metal;
(b) combining a metal alkoxide containing at least one said second metal with a polyether anhydride of said polyether acid to form a second metal acid salt of said at least one Group IV or Group V metal; and
(c) combining said first metal acid salt and said second metal acid salt to form said metal acid salt complex.

10. The process of claim 9 comprising combining at least one Group II metal and at least one Group IV alkoxide or at least one Group V alkoxide.

11. The process of claim 10 wherein said Group II metal is selected from the group consisting of barium and strontium, wherein said Group IV alkoxide is given by the formula $$(R-O)_4-Me(IV),$$

and wherein said Group V alkoxide is given by the formula $$(R-O)_5-Me(V),$$

where R is substituted and unsubstituted straight or branched alkyls ($C_1$ to $C_8$) and aryls, Me(IV) is selected from the group consisting of titanium and zirconium, and Me(V) is selected from the group consisting of vanadium, tantalum, and niobium.

12. The process of claim 9 comprising reacting said metal alkoxide with a mixture of said polyether acid arid said polyether acid anhydride, either simultaneously or sequentially.

13. The process of claim 9 wherein said polyether acid is given by the formula $$CH_3O(CH_2CH_2O)_nCH_2COOH$$

where n is 0 to 2.

* * * * *